3,269,946
STABLE WATER-IN-OIL EMULSIONS
Herbert F. Wiese, Cleveland, Ohio, assignor to The Lubrizol Corporation, Wickliffe, Ohio, a corporation of Ohio
No Drawing. Filed Mar. 16, 1965, Ser. No. 440,300
14 Claims. (Cl. 252—32.5)

This application is a continuation-in-part application of copending applications Serial No. 134,860, filed August 30, 1961, now forfeited and Serial No. 188,947 filed April 20, 1962, now abandoned.

This invention relates to emulsions and in a more particular sense it relates to stable water-in-oil emulsions which are suitable for use as lubricants and hydraulic fluids.

Emulsions, especially water-in-oil emulsions, find use as lubricants and particularly as fire-resistant hydraulic fluids. To be effective for such use, emulsions must be stable under wide ranges of service conditions such as temperature and pressure. Preferably, they should be characterized also by non-corrosiveness, detergency, suitable frictionable characteristics, anti-bacterial properties, and wear-reducing properties. Another important characteristic of emulsions, especially those to be used as hydraulic fluids, is fire-resistance. The requirement of these properties poses a difficult problem in the formulation of emulsions which are economically feasible for commercial production.

Accordingly, it is an object of this invention to provide stable water-in-oil emulsions.

It is another object of this invention to provide emulsions suitable for use as lubricants and hydraulic fluids.

It is another object of this invention to provide emulsions which are suitable especially for use as fire-resistant hydraulic fluids.

These and other objects are accomplished in accordance with this invention by providing a stable water-in-oil emulsion suitable for use as a lubricant and a hydraulic fluid comprising from about 1 to 80 parts of water, from about 20 to 99 parts of mineral oil, and from about 0.2 to 10 parts of a derivative of a hydrocarbon-substituted succinic acid having at least about 50 aliphatic carbon atoms in the substituent, said derivative is selected from the class consisting of (I) alkali metal salts, (II) alkaline earth metal salts, (III) esters of hydroxy-alkyl amines, and (IV) amides, imides, amidines, and salts of a nitrogen compound selected from the class consisting of ammonia, hydroxy-alkyl amines, and alkylene amines.

It will be noted that the succinic derivative contemplated for use in the emulsions is characterized by the presence of a relatively large hydrocarbon substituent on the sucinic radical which contains at least about 500 aliphatic carbon atoms. The term "hydrocarbon" means a group which is substantially hydrocarbon in character, although it may contain polar or non-hydrocarbon substituents provided that such non-hydrocarbon substituents are not present in proportions sufficiently large to alter the hydrocarbon nature of the group. The non-hydrocarbon substituents are exemplified by ether, chloro, nitro, keto, aldehydo radicals. They usually account for no more than about 10% by weight of the hydrocarbon group.

The sources of the hydrocarbon substituent include principally the high molecular weight petroleum fractions and olefin polymers, particularly polymers of mono-olefins having from 2 to about 30 carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-pentene, and 4-octene.

The polymers include also the interpolymers of the olefins such as those illustrated above with other interpolymerizable olefinic substances such as aromatic olefins, cyclic olefins, and polyolefins. The relative proportions of the mono-olefins to the other olefinic monomers in the interpolymers influence the stability and effectivenesses of the succinic derivatives in the emulsions of this invention. Thus, the interpolymers should be substantially aliphatic and substantially saturated, i.e., they should contain at least about 80%, preferably at least about 95%, on a weight basis, of units derived from the aliphatic mono-olefins and no more than about 5% of unsaturated linkages based upon the total number of carbon-to-carbon covalent linkages.

Examples of such interpolymers include the copolymer of 95% (by weight) of isobutene with 5% of styrene; the terpolymer of 98% of isobutene with 1% of piperylene and 1% of chloroprene; the terpolymer of 95% of isobutene with 2% of 1-butene and 3% of 1-hexene; the terpolymer of 60% of isobutene with 20% of 1-pentene and 20% of 1-octene; the copolymer of 80% of 1-hexene and 20% of 1-heptene; the terpolymer of 90% of isobutene with 2% of cyclohexene and 8% of propene; and the copolymer of 80% of ethylene and 20% of propene.

Succinic derivatives in which the substituent is derived from an olefin polymer having a molecular weight of about 750–5000 are preferred. Those from polymers of higher molecular weight, i.e., from about 10,000 to about 100,000 or higher likewise are useful.

Another source of the substituent comprises petroleum fractions such as high molecular weight white oils and synthetic alkanes such as are obtained by hydrogenation of high molecular weight olefins or fats.

The methods of preparing the polymers and interpolymers from which the succinic derivatives are prepared are known. A particularly useful method comprises the treatment of an olefin (e.g., isobutene) or a mixture of olefins at a temperature from about $-60°$ C. to about $20°$ C. in the presence of a Friedel-Crafts catalyst (e.g., boron trifluoride). The use of a solvent to facilitate mixing and the transfer of the heat of polymerization is advantageous. Solvents are exemplified by n-butane, isobutane, n-hexane, naphtha, carbon tetrachloride, and ethane.

As indicated previously, the succinic derivatives contemplated for use in the emulsions of this invention are the alkali metal salts, alkaline earth metal salts, esters of hydroxy-alkyl amines, as well as amides, imides, amidines, and salts of ammonia, hydroxy-alkyl amines, and alkylene amines. These derivatives may be prepared directly from the appropriately substituted succinic acids or from compounds capable of yielding such succinic acids, the latter being illustrated by the acid anhydrides, halides, and esters of volatile alcohols or phenols, etc. These succinic acid-producing compounds can be prepared by, e.g., the reaction of maleic anhydride with a high molecular weight olefin or a chlorinated hydrocarbon such as the olefin polymer described herein-above. The reaction involves merely heating the two reactants at a temperature preferably about $100°–200°$ C. The product from such a reaction is an alkenyl succinic anhydride. The alkenyl group may be hydrogenated to an alkyl group. The anhydride may be hydrolyzed by treatment with water or steam to the corresponding acid.

In lieu of the olefins or chlorinated hydrocarbons, other hydrocarbons containing an activating polar substituent, i.e., a substituent which is capable of activating the hydrocarbon molecule in respect to reaction with maleic acid or anhydride, may be used in the above-illustrated reaction for preparing the succinic acid-producing compounds. Such polar substituents are illustrated by sulfide, disulfide, nitro, mercaptan, bromine, ketone, or aldehyde radicals. Examples of such polar-substituted hydrocarbons include polypropylene sulfide, dipolyisobutene disulfide, nitrated mineral oil, di-polyethylene sulfide, brominated polyethylene, etc. Another method useful for preparing the succinic acids and their compounds involve the reaction of itaconic acid with an olefin or a polar-substituted hydrocarbon at a temperature usually within the range from about 100° C. to about 200° C.

The succinic acid halides can be prepared by the reaction of the acids or their anhydrides with a halogenation agent such as phosphorus tribromide, phosphorus pentachloride, or thionyl chloride. The esters of such acids can be prepared simply by the reaction of the acids or the anhydrides with an alcohol or a phenolic compound such as methanol, ethanol, phenol, naphthol, etc. The esterification is usually promoted by the use of an alkaline catalyst such as sodium hydroxide or sodium alkoxide or an acidic catalyst such as sulfuric acid. The nature of the alcoholic or phenolic portion of the ester radical appears to have little influence on the utility of such esters as the reactants in the process described herein-above. In most instances the esters derived from volatile alcohols or phenols are preferred.

The alkali metal and alkaline earth metal salts of the succinic acids include principally the salts of sodium, potassium, magnesium, barium, calcium, and strontium. They can be obtained simply by neutralizing a succinic acid with the appropriate metal oxide, hydroxide, carbonate, bicarbonate, mercaptide, alcoholate, phenate, or the elemental metal. They are also formed by the saponification of an acid ester with, e.g., metal oxide or hydroxide.

The succinic acid esters of hydroxy-alkyl amines are most conveniently prepared by the reaction of the succinic acid or anhydride with the hydroxy-alkyl amine under esterification conditions. An alternative method involves the trans-esterification of a succinic acid ester of a relatively volatile alcohol or phenol with the amino-alkyl alcohol. Both the esterification and the trans-esterification reactions are promoted by a small amount of a catalyst such as sodium methoxide, potassium hydroxide, or sulfuric acid, although in most instances the reaction proceeds readily simply upon heating of the reactants. The hydroxy-alkyl amines include the mono-, di-, and tri-(hydroxyalkyl)amines, especially those in which the alkyl radical is a lower alkyl radical, i.e., one having less than about 6 carbon atoms, such as ethanol amine, diethanol amine, triethanol amine, N-(2-hydroxy-1-butyl) dodecyl amine, N-(3-hydroxy-1-propyl) octyl amine, N,N-bis(2-hydroxy-1-propyl) oleyl amine, N-(2-hydroxy-ethyl) cyclohexyl amine, and N,N-bis-(2-hydroxy-ethyl) behenyl amine.

The amides, imides, amidines, and salts of the succinic acids are those derived from ammonia, hydroxy-alkyl amines, and alkylene amines. The hydroxy-alkyl amines are as illustrated previously. The alkylene amines conform for the most part to the formula

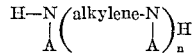

wherein $n$ is an integer preferably less than about 10, A is a substantially hydrocarbon or hydrogen radical, and the alkylene radical is preferably a lower alkylene radical having less than about 8 carbon atoms. The alkylene amines include principally methylene amines, ethylene amines, butylene amines, propylene amines, pentylene amines, hexylene amines, heptylene amines, octylene amines, other polymethylene amines, and also the cyclic and the higher homologues of such amines such as piperazines and amino-alkyl-substituted piperazines. They are exemplified specifically by: ethylene diamine, triethylene tetramine, propylene diamine, decamethylene diamine, octamethylene diamine, di(heptamethylene)triamine, tripropylene tetramine, tetraethylene pentamine, trimethylene diamine, pentaethylene hexamine, di(trimethylene) triamine, 2-heptyl-3-(2-aminopropyl)imidazoline, 4-methyl-imidazoline, 1,3-bis(2-aminoethyl)imidazoline, pyrimidine, 1-(2-aminopropyl)piperazine, 1,4-bis(2-aminoethyl)piperazine, and 2-methyl-1-(2-aminobutyl)piperazine. Higher homologues such as are obtained by condensing two or more of the above-illustrated alkylene amines likewise are useful.

The ethylene amines are especially useful. They are described in some detail under the heading "Ethylene Amines" in "Encyclopedia of Chemical Technology" Kirk and Othmer, Volume 5, pages 898–905, Interscience Publishers, New York (1950). Such compounds are prepared most conveniently by the reaction of an alkylene chloride with ammonia. The reaction results in the production of somewhat complex mixtures of alkylene amines, including cyclic condensation products such as piperazines. These mixtures find use in the process of this invention. On the other hand, quite satisfactory products may be obtained also by the use of pure alkylene amines. An especially useful alkylene amine for reasons of economy as well as effectiveness of the products derived therefrom is a mixture of ethylene amines prepared by the reaction of ethylene chloride and ammonia and having a composition which corresponds to that of tetraethylene pentamine.

Hydroxyalkyl-substituted alkylene amines, i.e., alkylene amines having one or more hydroxyalkyl substituents on the nitrogen atoms, likewise are contemplated for use herein. The hydroxyalkyl-substituted alkylene amines are preferably those in which the alkyl group is a lower alkyl group, i.e., having less than about 6 carbon atoms. Examples of such amines include N-(2-hydroxyethyl) ethylene diamine, N,N'-bis(2-hydroxyethyl)ethylene diamine, 1-(2-hydroxyethyl)piperazine, mono-hydroxypropyl-substituted diethylene triamine, 1,4-bis(2-hydroxypropyl)piperazine, di-hydroxypropyl-substituted tetraethylene pentamine, N-(3-hydroxypropyl)tetramethylene diamine, and 2-heptadecyl-1-(2-hydroxyethyl)imidazoline.

Higher homologues such as are obtained by condensation of the above-illustrated alkylene amines or hydroxy alkyl-substituted alkylene amines through amino radicals or through hydroxy radicals are likewise useful. It will be appreciated that condensation through amino radicals results in a higher amine accompanied with removal of ammonia and that condensation through the hydroxy radicals results in products containing ether linkages accompanied with removal of water.

These amides, imides, amidines, and salts of succinic acids are most conveniently prepared by the reaction of a succinic acid-producing compound with ammonia or the above-illustrated amine. Depending upon the reaction temperature and the nature of the amine reactant the products may contain amide, imide, imidazoline, or salt linkages or a mixture of such linkages. Also, the amidine linkages derived from an alkylene amine may be cyclic amidine linkages such as are found in imidazolines. The formation of some of these succinic derivatives is illustrated by the reaction between a succinic anhydride with ethylene diamine as represented by the following equations:

(A)
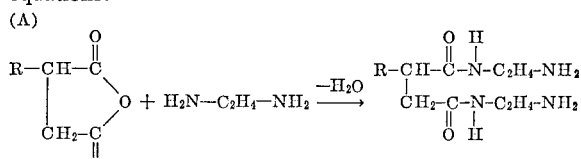

(B)
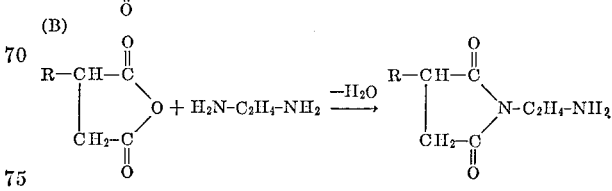

(C)

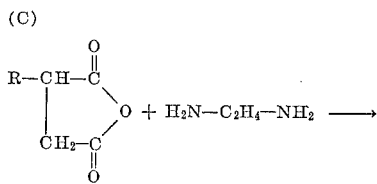

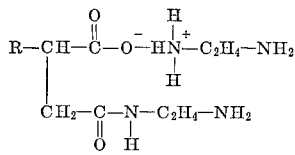

(D)

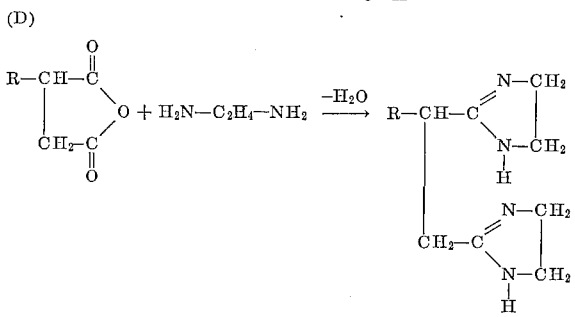

The formation of the succinimide is illustrated by the following equation:

(E)

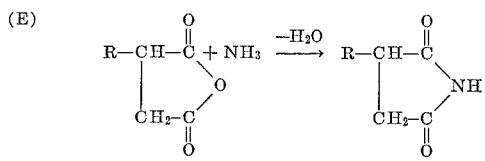

It is to be noted, of course, that these equations are merely illustrative and that a wide variety of products can result. It is to be noted also that if the amine reactant used is a tertiary amine, the product will be a salt. Also, if the reaction temperature is relatively low such as below about 60° C. the product with a succinic acid will contain predominantly salt linkages. Such salt products may be converted, if desired, by heating to above 80° C. to products having predominantly amide, imide, and amidine linkages. The use of a solvent such as benzene, toluene, naphtha, mineral oil, xylene, n-hexane, or the like is often desirable in the above reaction to facilitate the control of the reaction temperature.

The relative proportions of the succinic acid-producing reactant and of the amine reactant usually are such that at least about one-half of a stoichiometrically equivalent amount of the amine reactant is used for each equivalent of the acid-producing reactant. In this regard it will be noted that the equivalent weight of the amine reactant is based upon the number of the amino radicals in the molecular structure and the equivalent weight of the succinic acid-producing compound is based upon the number of the acid-producing radicals in the molecular structure. Thus, ethylene diamine has two equivalents per mole; tri(trimethylene)tetramine has four equivalents per mole, and 2-amino-ethyl piperazine has three equivalents per mole.

In most instances the preferred amount of the amine reactant is approximately from 1 to 2 equivalents for each equivalent of the succinic acid reactant used, although there appears to be no upper limit other than that imposed by the stoichiometry for the desired reaction.

These succinic derivatives likewise can be obtained from succinic acid halides, imides, esters, or other succinic acid-producing compounds. For example, the amide of ethylene diamine is formed by heating a mixture of ethylene diamine with the di-methyl ester of an appropriately substituted succinic acid or with a di-halide of the acid.

The following examples illustrate the methods for preparing the succinic derivatives useful in the emulsions of this invention: (parts are by weight unless otherwise indicated).

EXAMPLE A

A polyisobutenyl succinic anhydride is prepared by the reaction of a chlorinated polyisobutylene with maleic anhydride at 200° C. The chlorinated polyisobutylene is prepared by blowing chlorine gas through polyisobutylene having an average molecular weight of 1000 at a temperature of 104°–110° C. until the chlorine content reaches 4.3%. The resulting alkenyl succinic anhydride is found to have an acid number of 109 (corresponding to an equivalent weight of 514). To a mixture of 1028 parts (2 equivalents) of this polyisobutenyl succinic anhydride and 815 parts of mineral oil there is added 210 parts (2 equivalents) of diethanolamine at 80° C. over a period of 2 hours. The mixture is heated to 150°–155° C. and blown with nitrogen for 7 hours. The product is found to have a nitrogen content of 1.4%.

EXAMPLE B

A mixture of 1000 parts (1.94 equivalents) of the polyisobutenyl succinic anhydride of Example A and 848 parts of mineral oil is heated to 60° C. and 289 parts (1.94 equivalents) of triethanolamine is added dropwise over a period of 2 hours. The resulting mixture is heated to 150° C. while being blown with nitrogen. The mixture is held at this temperature while blowing with nitrogen for 17 hours. The residue is found to have a nitrogen content of 1.3% and a hydroxyl content of 2.8%.

EXAMPLE C

A mixture of 300 parts of the polyisobutenyl succinic anhydride of Example A and 160 parts of mineral oil is heated to 65°–95° C. and an equivalent amount (25 *parts*) of a commercial ethylene amine mixture having an average composition corresponding to that of tetraethylene pentamine is added. The mixture is then heated to 150° C. to distill all of the water formed in the reaction. Nitrogen is bubbled through the mixture at this temperature to insure removal of the last traces of water. The residue is diluted by 79 parts of mineral oil and this oil solution is found to have a nitrogen content of 1.6%.

EXAMPLE D

A mixture of 514 parts (1 equivalent) of the polyisobutenyl succinic anhydride of Example A, 354 parts of mineral oil, and 9 parts of water is heated to 100°–105° C. for 1 hour to form the free acid. The mixture is then cooled to 60° C. and blown with anhydrous ammonia until 17 parts (1 equivalent) of ammonia is absorbed. The reaction mixture is then heated for 1 hour at 90° C. The residue has a nitrogen content of 1.4%.

EXAMPLE E

A mixture of 1188 parts (2.12 equivalents) of a polyisobutenyl succinic anhydride prepared as in Example A and 338 parts of mineral oil is heated to 80° C. and blown with anhydrous ammonia until 44 parts (2.6 equivalents) of ammonia is absorbed. The mixture is stirred at this temperature for 4.3 hours and then heated to 140° C. in 3 hours. The mixture is held at 140°–150° C. for 2 hours while blowing with nitrogen. The residue is then filtered and the filtrate is found to have a nitrogen content of 0.98%.

EXAMPLE F

A mixture of 1400 parts of the product of Example E and 1080 parts of mineral oil is heated to 160°–170° C. and 7 parts of sodium methoxide is added. Ethylene oxide (220 parts, 5 equivalents) is bubbled below the surface of the liquid. The mixture is then heated to 170°

/3 mm. and the residue is found to have a nitrogen content of 0.58%.

EXAMPLE G

A mixture of 1.5 equivalents of the polyisobutenyl succinic anhydride of Example A, 1.5 equivalents of trimethylene diamine, 588 parts of mineral oil, and 500 parts (by volume) of xylene is heated to reflux at 140° C. The mixture is held at this temperature for 12 hours to remove water. The reaction mixture is then washed with water and dried by heating to 150° C./20 mm. The residue is the product.

EXAMPLE H

A mixture of 1 equivalent of the polyisobutenyl succinic anhydride of Example A, 1 equivalent of 2-aminoethyl piperazine, 492 parts of mineral oil, and 500 parts (by volume) of xylene is heated at reflux for 10 hours while removing water. The mixture is then washed with water and dried by heating to 150° C./20 mm. The residue is the product.

EXAMPLE I

A mixture of 514 parts (1 equivalent) of the polyisobutenyl succinic anhydride of Example A and 390 parts of mineral oil is heated to 50° C. and there is added 61 parts of chlorosulfonic acid over a period of 2 hours. The reaction is exothermic and evolves hydrogen chloride. The mixture is purged with nitrogen for 1 hour at 60° C. to remove the remaining chloride, and 120 parts of a 50% aqueous solution of sodium hydroxide is added over a period of 30 minutes at 60°–80° C. At this point 511 parts of mineral oil is added, and the mixture is heated to 110° C. to remove water. The reaction mixture is then heated to 200° C. and purged with nitrogen for 5 hours. The mixture is filtered and the filtrate found to have a sodium content of 1.99% and a sulfur content of 2.14%.

EXAMPLE J

The procedure of Example C is repeated using 1.5 equivalents (38 parts) of the commercial ethylene amine mixture. The resulting product has a nitrogen content of 2.1%.

EXAMPLE K

A potassium salt of the polyisobutenyl succinic acid is obtained by neutralizing the succinic anhydride of Example A with a stoichiometric amount of potassium hydroxide at 120°–150° C.

EXAMPLE L

A barium salt is obtained by neutralizing the polyisobutenyl succinic anhydride of Example A with barium hydroxide at 100°–150° C.

EXAMPLE M

A calcium salt is obtained by neutralizing the polyisobutenyl succinic anhydride of Example A with calcium oxide at 100°–150° C.

The oil of the emulsion may be a hydrocarbon oil having viscosity values from 50 SUS (Saybolt Universal Seconds) at 100° F. to 200 SUS at 210° F. Mineral oils having lubricating viscosities (e.g., SAE 5–90 grade oils) are especially advantageous for use in the emulsion. A mixture of oils of different sources likewise is useful. Such a mixture is available from mineral oils, vegetable oils, animal oils, synthetic oils of the silicon type, synthetic oils of the polyolefin type, synthetic oils of the polyester type, etc.

The emulsions of this invention contain from 1 to 80 parts of water and from 20 to 99 parts of oil. ((All parts in this specification and claims are expressed in terms of weight unless otherwise indicated.) However, emulsions having the most desirable properties are composed of from 30 to 50 parts of water and 50 to 70 parts of oil. Also, emulsions intended for use as fire-resistant hydraulic fluid should contain at least about 30% of water. The concentration of the succinic acid derivative in the emulsions is from 0.2 to 10 parts, more often from 1 to 5 parts, per 100 parts of the emulsion. The principal function of the succinic acid derivative is that of an emulsifier, although it also imparts detergency to the emulsion.

The emulsions can be prepared simply by mixing water, oil, the succinic acid derivative, and any other ingredient which may be desirable, in a homogenizer or any other efficient blending device. Heating the emulsion during or after it is prepared is not necessary. The order of mixing of the ingredients is not critical, although it is convenient first to prepare an oil concentrate containing from about 50 to 95 parts of the oil-soluble ingredients and from about 5 to 50 parts of oil and then to emulsify the concentrate with water in appropriate proportions.

Although the emulsions described herein-before are, in themselves, useful, they nevertheless are susceptible to improvement by the incorporation of chemical additives which impart properties desired for various specific applications. One such additive is an emulsion stabilizer which functions to improve the stability of the emulsion against deterioration due to temperature, pressure, oxidation of the oil, and other harmful environments. Stabilizers include phosphatides, especially those having the structural formula

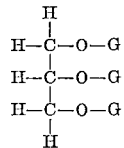

wherein G is selected from the class consisting of fatty acyl radicals and phosphorus-containing radicals having the structural grouping

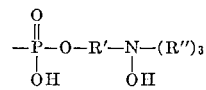

wherein R' is a lower alkylene radical having from 1 to about 10 carbon atoms and R'' is a lower alkyl radical having from 1 to 4 carbon atoms, and at least one but no more than two of the G radicals being said phosphorus-containing radical. The fatty acyl radicals are for the most part those derived from fatty acids having from 8 to 30 carbon atoms in the fatty radicals such as octanoic acid, stearic acid, oleic acid, palmitic acid, behenic acid, myristic acid, and oleostearic acid. Especially desirable radicals are those derived from comercial fatty compounds such as soyabean oil, cotton seed oil, and castor seed oil. A particularly effective phosphatide is soyabean lecithin which is described in detail in Encyclopedia of Chemical Technology, Kirk and Othmer, volume 8, pages 309–326 (1952).

The emulsion stabilizer may be a mono-aryl ether of an aliphatic glycol. Specific examples include monophenyl ether of ethylene glycol, mono-(heptylphenyl) ether of triethylene glycol, mono - (alpha-octyl-beta-naphthyl) ether of tetrapropylene glycol, mono-(polyisobutene(molecular weight of 1000)-substituted phenyl) ether of octapropylene glycol, and mono-(o,p-dibutylphenyl) ether of polybutylene glycol, mono-(heptylphenyl) ether of trimethylene glycol and mono-(3,5-dioctylphenyl) ether of tetra-trimethylene glycol, etc. The aliphatic glycol may be a polyalkylene glycol. It is preferably one in which the alkylene radical is a lower alkylene radical having from 1 to 10 carbon atoms. Thus, the aliphatic glycol is illustrated by ethylene glycol, trimethylene glycol, propylene glycol, tetramethylene glycol, 1,2-butylene glycol, 2,3-butylene glycol, tetramethylene glycol, hexamethylene glycol, or the like. These mono-aryl ethers are obtained by the condensation of a phenolic compound such as an alkylated phenol or naphthyl with one or more moles of an epoxide such as ethylene oxide, propylene oxide, trimethylene oxide, or 2,3-hexalene oxide. The condensation is promoted by a basic catalyst such as an alkali or alkaline earth metal hydroxide, alcoholate, or phenate. The temperature at which the condensation is carried out may be varied within wide ranges such as from room temperature to about 250° C. Ordinarily it is preferably 50°–150° C. More than one mole of the epoxide may condense with the phenolic compound so that the product may contain in its molecular structure one or more of the radicals derived from the epoxide. A polar-substituted alkylene oxide such as epichlorohydrin or epibromohydrin likewise is useful to prepare the mono-aryl ether product and such product likewise is useful as the emulsion stabilizer in this invention.

Likewise useful as the emulsion stabilizers are the mono-alkyl ethers of the aliphatic glycols in which the alkyl radical is, e.g., octyl, nonyl, dodecyl, behenyl, etc. The fatty acid esters of the mono-aryl or mono-alkyl ethers of aliphatic glycols also are useful. The fatty acids include, e.g., acetic acid, formic acid, butanoic acid, hexanoic acid, oleic acid, stearic acid, behenic acid, decanoic acid, iso-stearic acid, linolenic acid, as well as commercial acid mixtures such as are obtained by the hydrolysis of tall oils, sperm oils, etc. Specific examples are the oleate of mono-(heptylphenyl) ether of tetraethylene glycol and acetate of mono-(polypropene (having molecular weight of 1000)-substituted phenyl)ether of tri-propylene glycol.

The alkali metal and ammonium salts of sulfonic acids likewise are emulsion stabilizers. The acids are illustrated by decylbenzene sulfonic acid, di-dodecylbenzene sulfonic acid, mahogany sulfonic acid, heptylbenzene sulfonic acid, polyisobutene sulfonic acid (molecular weight 750), and decylnaphthalene sulfonic acid, and tri-decylbenzene sulfonic acid. The salts are illustrated by the sodium, potassium, or ammonium salts of the above acids.

Only a small amount of the stabilizer is necessary for the purpose. It may be as little as 0.01 part and seldom exceeds 2 parts per 100 parts of the emulsion. In most instances it is within the range from 0.1 to 1 part per 100 parts of the emulsion.

Another additive which finds use in the emulsion is an extreme pressure agent, i.e., one which improves the load-carrying properties of the emulsion. It is illustrated by a lead or nickel or a Group II metal phosphorodithioate in which the metal may be magnesium, calcium, barium, strontium, zinc, or cadmium. Specific examples of the metal phosphorodithioates include zinc di(4-methyl-2-pentyl)phosphorodithioate, zinc 0-methyl-0'-dodecylphosphorodithioate, barium diheptylphosphorodithioate, barium di(n-butylphenyl)phosphorodithioate, magnesium di-cyclohexylphospohrodithioate, cadmium salt of an equal molar mixture of dimethylphosphorodithioic acid and di-octylphosphorodithioic acid, zinc di-n-nonylphosphorodithioate, zinc di-dodecylphosphorodithioate, lead di-phenyl phosphorodithioate, and nickel di-octylphosphorodithioate.

Methods for preparing the phosphorodithioic acids are known in the art including, for example, the reaction of an alcohol or a phenol with phosphorus pentasulfide. Likewise known are the methods for preparing the Group II metal salts of phosphorodithioic acids. Such methods are illustrated by the neutralization of phosphorodithioic acids or mixtures of such acids with zinc oxide.

Other extreme pressure agents useful in the emulsions of this invention include the chlorinated waxes; sulfurized or phosphosulfurized fatty acid esters; di- and tri-hydrocarbon phosphites and phosphates; di-hydrocarbon polysulfides; and metal dithiocarbamates. The chlorinated waxes are exemplified by chlorinated eicosane having a chlorine content of 50% or other chlorinated petroleum waxes having a chlorine content of 5%–60%. The sulfurized fatty esters are obtained by the treatment of a lower alkyl ester of a fatty acid having at least about 12 carbon atoms with a sulfurizing agent such as sulfur, sulfur mono-chloride, sulfur dichloride, or the like. The fatty acid etsers are illustrated by metyhl oleate, methyl stearate, isopropyl myristate, cyclohexyl ester of tall oil acid, ethyl, palmitate, isooctyl laurate, diester of ethylene glycol with stearic acid, etc. Commercial mixtures of esters likewise are useful. They include, for example, sperm oil, menhaden oil, glycerol thioleate, etc. The sulfurization is effected most conveniently at temperatures between 100° C. and 250° C. More than one atom of sulfur can be incorporated into the ester and for the purpose of this invention sulfurized esters having as many as four or five atoms of sulfur per molecule have been found to be useful. Examples include sulfurized sperm oil having a sulfur content of 5%, sulfurized tall oil having a sulfur content of 9%, sulfurized methyl oleate having a sulfur content of 3%, and sulfurized stearyl stearate having a sulfur content of 15%.

The phosphosulfurized fatty acid esters are obtained by the treatment of the esters illustrated above with a phosphorus sulfide such as phosphorus pentasulfide, phosphorus sesquisulfide, or phosphorus heptasulfide. The treatment is illustrated by mixing an ester with from about 0.5% to 25% of a phosphorus sulfide at a temperature within the range from about 100° C. to 250° C. The products contain both phosphorus and sulfur but the precise chemical structure of such products is not clearly understood.

The phosphites and phosphates useful herein are the di- and tri-esters of phosphorous or phosphoric acid in which the ester radical is derived from a substantially hydrocarbon radical including aryl, alkyl, alkaryl, arylalkyl, or cycloalkyl radical as well as a hydrocarbon radical having a polar substituent such as chloro, nitro, bromo, ether, or the like. Particularly desirable phosphites and phosphates are those in which the ester radicals are phenyl, alkylphenyl radicals, or alkyl radicals containing from 6 to 30 carbon atoms. Examples are: dibutyl phosphite, diheptyl phosphite, dicyclohexyl phosphite, di-(pentylphenyl)phosphite, bis-(dipentylphenyl)phosphite, tridecyl phosphite, di-stearyl phosphite, dimethyl naphthyl phosphite, oleyl 4-pentylphenyl phosphite, triphenyl phosphite, bis(hexapropylene-substituted phenyl)phosphite, tri(n-chloro-3-heptylphenyl)phosphite, triphenyl phosphate, tricresyl phosphate, tri(p-chlorophenyl)phosphate, and tri(heptylphenyl)phosphate.

The metal dithiocarbamates include principally those of zinc, lead, strontium, nickel, cadmium, and palladium with N,N-dialkyldithiocarbamic acids in which the alkyl radical contains from 3 to about 30 carbon atoms. Examples are zinc N,N-dioctyl dithiocarbamate, lead N,N-dicyclohexyl dithiocarbamate, cadmium N,N-dibehenyl dithiocarbamate, lead N,N-didodecyl dithiocarbamate, and mixtures thereof.

The concentration of the extreme pressure agent is usually within the range from about 0.05 to about 5 parts, although it is seldom necessary to employ more than 2 parts of this agent per 100 parts of the emulsion.

Another type of additive which finds use in the emulsion is a rust-inhibiting agent. The effective rust-inhibiting agents are the salts of an aromatic acid such as benzoic acid, toluic acid, naphthoic acid, o-phthalic acid, or p-phthalic acid with an aliphatic amine, especially an aliphatic primary amine. The amines should have at least about 8 carbon atoms in a molecule and preferably are tertiary-alkyl primary amines having from aboht 12 to about 18 carbon atoms in the alkyl radical. The amines include stearyl amine, oleyl amine, myristyl amine, palmityl amine, n-octyl amine, dodecyl amine, octadecyl amine, and other commercial primary amine mixtures, especially the one in which the aliphatic radical is a mixture of $C_{11-14}$ tertiary-alkyl radicals having an average of 12 carbon atoms.

Salts derived from other acids such as p-aminobenzoic acid and o-chlorobenzoic acid likewise are useful.

The salts of amines with the aromatic acids are prepared simply by mixing the reactants at a temperature below the dehydration temperature, i.e., below 90° C. In most instances the reaction is exothermic and heating is not necessary. A solvent such as benzene, toluene, naphtha, or chlorobenzene may be used.

Likewise useful as rust-inhibiting agents are the amines described hereinabove. The aliphatic primary amines in which the aliphatic radical is a tertiary-alkyl radical having from 10 to 16 carbon atoms are especially effective.

Still another class of rust-inhibiting agents are the hydroxy-alkyl amines, especially the long chain (i.e., $C_{8-30}$) aliphatic amines containing one or two hydroxy-alkyl substituents on the amine nitrogen atom. Examples are N-(2-hydroxyethyl)octylamine, N,N-di-(2-hydroxy-1-propyl)dodecylamine, N-(3-hydroxy-1-pentyl)octadecylamine, and N,N-di-(2-hydroxy-3-butyl)decylamine.

Also useful as the rust-inhibiting agents are the nitrous acid salts of the long chain aliphatic amines illustrated above. Such salts are obtained simply by mixing at ordinary temperatures such as room temperature an amine with nitrous acid. Specific examples include the nitrous acid salt of the tertiary-alkyl ($C_{11-14}$) primary amine and the nitrous acid salt of octadecylamine.

The concentration of rust-inhibiting agent in the emulsion depends to some extent upon the relative concentration of water in the emulsion. Ordinarily from about 0.01 part to about 2 parts of a rust-inhibiting agent per 100 parts of the emulsion is sufficient.

Still another type of additive which is useful in the emulsions here is a supplemental emulsifier as exemplified by a sulfonate such as barium dodecylbenzenesulfonate, ammonium didodecylbenzenesulfonate, sodium mahogany sulfonate, potassium stearate, calcium oleate, a basic barium mahogany sulfonate, or a basic calcium mahogany sulfonate.

Still another type of additive which finds use in these emulsions is a foam-inhibitor which may be a commercial dialkyl siloxane polymer or a polymer of an alkyl methacrylate. Freezing point depressants, i.e., water-soluble polyhydric alcohols such as glycerol or other polar substances such as Cellosolve are also useful. The concentration of these additives usually is less than 1 part per 100 parts of the emulsion.

Bactericides are also useful in the emulsions of this invention. They are illustrated by nitro-bromo-alkanes (such as 3-nitro-1-propyl bromide), nitro-hydroxy-alkanes (such as tri-(hydroxymethyl)nitromethane, 2-nitro-2-ethyl-1,3-propane-diol, and 2-nitro-1-butanol), and boric acid esters (such as glycerol borate). The concentration of the bactericide may be 0.001 to 1 part per 100 parts of the emulsion.

Oxidation-inhibitors useful in the emulsions of this invention include the hindered phenols such as 2,4-di-tert-butyl-6-methylphenol, 4,4'-methylene-(2,6-di-tert-pentylphenol), and 2,6-di-tert-octyl-4-sec-butylphenol. The concentration of the oxidation-inhibitors is usually 0.01 to 2 parts per 100 parts of the emulsion.

The following examples illustrate the concentrates and emulsions containing the oil-soluble substituted succinic derivatives of this invention.

*Example 1 (concentrate)*

| | Parts by weight |
|---|---|
| The product of Example A | 9.0 |
| Soyabean lecithin | 1.8 |
| Tertiary-alkyl primary amine having a molecular weight of 191 in which the tertiary alkyl radical is a mixture of $C_{11}$ and $C_{14}$ radicals | 0.6 |
| Zinc di-isooctyl phosphorodithioate | 3.0 |
| SAE 20 mineral lubricating oil | 285.6 |
| Silicone anti-foam agent | 0.0045 |

*Example 2 (emulsion)*

| | Parts by weight |
|---|---|
| The product of Example B | 950 |
| Soyabean lecithin | 190 |
| The teritary-alkyl primary amine of Example 1 | 63 |
| Zinc di-isooctyl phosphorodithioate | 317 |
| SAE 5 mineral lubricating oil | 30,160 |
| Silicone anti-foam agent | 0.75 |
| Water | 24,000 |

*Example 3 (emulsion)*

| | |
|---|---|
| The product of Example C | 360 |
| Soyabean lecithin | 72 |
| Lauryl diethanol amine | 24 |
| Chlorinated eicosane wax (50% chlorine) | 24 |
| SAE 5 mineral lubricating oil | 11,520 |
| Silicone anti-foam agent | 0.30 |
| Water | 8000 |

*Example 4 (emulsion)*

| | |
|---|---|
| The product of Example J | 18 |
| Soyabean lecithin | 3.6 |
| Lauryl diethanol amine | 1.2 |
| Chlorinated eicosane wax (50% chlorine) | 1.2 |
| SAE 5 mineral lubricating oil | 576.0 |
| Water | 400 |

*Example 5 (emulsion)*

| | |
|---|---|
| The product of Example C | 30.0 |
| N-tert-nonyl acrylamide | 3.6 |
| Lauryl diethanol amine | 1.2 |
| Chlorinated eicosane wax (50% chlorine) | 1.2 |
| SAE 20 mineral lubricating oil | 564.0 |
| Silicone anti-foam agent | 0.015 |
| Water | 400.0 |

*Example 6 (concentrate)*

| | |
|---|---|
| The product of Example D | 9.0 |
| Soyabean lecithin | 1.8 |
| The tertiary-alkyl primary amine of Example 1 | 0.6 |
| Zinc di-isooctyl phosphorodithioate | 3.0 |
| SAE 5 mineral lubricating oil | 285.6 |
| Silicone anti-foam agent | 0.0045 |

*Example 7 (concentrate)*

| | |
|---|---|
| The product of Example E | 950.4 |
| Soyabean lecithin | 189.9 |
| The tertiary-alkyl primary amine of Example 1 | 63.3 |
| Nonylphenoxy poly(ethyleneoxy)ethanol | 63.3 |
| Zinc di-isooctyl phosphorodithioate | 316.8 |
| SAE 20 mineral lubricating oil | 30,096 |
| Silicone anti-foam agent | 0.45 |

*Example 8 (concentrate)*

| | |
|---|---|
| The product of Example F | 9.0 |
| Soyabean lecithin | 1.8 |
| The tertiary-alkyl primary amine of Example 1 | 0.6 |
| Zinc di-isooctyl phosphorodithioate | 3.0 |
| SAE 30 mineral lubricating oil | 285.6 |
| Silicone anti-foam agent | 0.0045 |

*Example 9 (emulsion)*

| | |
|---|---|
| The product of Example G | 9.0 |
| Soyabean lecithin | 1.8 |
| The tertiary-alkyl primary amine of Example 1 | 0.6 |
| Zinc di-isooctyl phosphorodithioate | 3.0 |
| SAE 30 mineral lubricating oil | 285.6 |
| Silicone anti-foam agent | 0.0075 |
| Water | 200 |

*Example 10 (concentrate)*

| | |
|---|---|
| The product of Example H | 9.0 |
| Soyabean lecithin | 1.8 |
| The tertiary-alkyl primary amine of Example 1 | 0.6 |
| Zinc di-isooctyl phosphorodithioate | 3.0 |
| SAE 40 mineral lubricating oil | 285.6 |
| Silicone anti-foam agent | 0.0045 |

Example 11 (concentrate)

| | Parts by weight |
|---|---|
| The product of Example I | 9.0 |
| Soyabean lecithin | 1.8 |
| The tertiary-alkyl primary amine of Example 1 | 0.6 |
| Zinc di-isooctyl phosphorodithioate | 3.0 |
| SAE 20 mineral lubricating oil | 285.6 |
| Silicone anti-foam agent | 0.0045 |

Example 12 (concentrate)

| | Parts by weight |
|---|---|
| The product of Example E | 9.0 |
| Soyabean lecithin | 1.8 |
| The benzoic acid salt of the tertiary-alkyl primary amine of Example 1 | 0.6 |
| Lead diamyl dithiocarbamate | 3.0 |
| Sulfurized sperm oil having a sulfur content of 10% | 3.0 |
| SAE 20 mineral lubricating oil | 286.6 |
| Silicone anti-foam agent | 0.0045 |

Example 13 (concentrate)

| | Parts by weight |
|---|---|
| The product of Example E | 18.0 |
| Soyabean lecithin | 3.6 |
| The benzoic acid salt of the tertiary-alkyl primary amine of Example 1 | 1.2 |
| Tri-meta cresyl phosphate | 6.0 |
| SAE mineral lubricating oil | 571.2 |
| Silicone anti-foam agent | 0.0090 |

Example 14 (emulsion)

| | Parts by weight |
|---|---|
| The product of Example E | 18 |
| Soyabean lecithin | 3.6 |
| The benzoic acid salt of the tertiary-alkyl primary amine of Example 1 | 1.2 |
| The adduct prepared by heating zinc dicumyl dithiophosphinate with 0.5 equivalent of the tertiary-alkyl primary amine of Example 1 at 80° for 2 hours | 12.0 |
| SAE 5 mineral lubricating oil | 565.2 |
| Silicone anti-foam agent | 0.015 |
| Water | 400.0 |

Example 15 (concentrate)

| | Parts by weight |
|---|---|
| The product of Example E | 9.0 |
| Soyabean lecithin | 1.8 |
| The benzoic acid salt of the tertiary-alkyl primary amine of Example 1 | 0.6 |
| Sulfurized sperm oil having a sulfur content of 10% | 1.5 |
| Zinc di-isooctyl phosphorodithioate | 9.0 |
| SAE 20 mineral lubricating oil | 278.1 |
| Silicone anti-foam agent | 0.0045 |

Example 16 (concentrate)

| | Parts by weight |
|---|---|
| The product of Example J | 9.0 |
| Soyabean lecithin | 1.8 |
| The nitrous acid salt of the tertiary-alkyl primary amine of Example 1 | 0.6 |
| Dipentene disulfite having a sulfur content of 36% | 6.0 |
| SAE 30 mineral lubricating oil | 279.6 |
| Silicone anti-foam agent | 0.0039 |

Example 17 (concentrate)

| | Parts by weight |
|---|---|
| The product of Example J | 9.0 |
| Soyabean lecithin | 1.8 |
| Tetrapropylene succinic acid | 0.15 |
| Sulfurized sperm oil having a sulfur content of 10% | 15.0 |
| 4-methyl-2,6-di-tert butyl phenol | 1.5 |
| SAE 20 mineral lubricating oil | 272.6 |
| Silicone anti-foam agent | 0.0045 |

Example 18 (emulsion)

| | Parts by weight |
|---|---|
| The product of Example J | 18.0 |
| Soyabean lecithin | 3.6 |
| The nitrous acid salt of the tertiary-alkyl primary amine of Example 1 | 1.2 |
| Sulfurized sperm oil having a sulfur content of 10% | 18.0 |
| 4-methyl-2,6-di-tert butyl phenol | 3.0 |
| SAE 5 mineral lubricating oil | 556.2 |
| Silicone anti-foam agent | 0.015 |
| Water | 400.0 |

Example 19 (concentrate)

| | Parts by weight |
|---|---|
| The product of Example E | 9.0 |
| Soyabean lecithin | 1.8 |
| The nitrous acid salt of Example 18 | 0.6 |
| Nickel didecyl phosphorodithioate | 6.0 |
| SAE 20 mineral lubricating oil | 279.6 |
| Silicone anti-foam agent | 0.0039 |

Example 20 (concentrate)

| | Parts by weight |
|---|---|
| The product of Example E | 18.0 |
| Soyabean lecithin | 3.6 |
| N-methyl-N-carboxymethyl oleamide | 1.2 |
| 2,2'-methylene bis(3-methyl-5-tert-butylphenol) | 12.0 |
| SAE 20 mineral lubricating oil | 565.2 |
| Silicone anti-foam agent | 0.0090 |

Example 21 (emulsion)

| | Parts by weight |
|---|---|
| The product of Example J | 18.0 |
| Soyabean lecithin | 3.6 |
| The benzoic acid salt of the tertiary-alkyl primary amine of Example 1 | 1.2 |
| Sulfurized sperm oil having a sulfur content of 10% | 6.0 |
| SAE 5 mineral lubricating oil | 571.2 |
| Silicone anti-foam agent | 0.015 |
| Water | 400.0 |

Example 22 (emulsion)

| | Parts by weight |
|---|---|
| The product of Example E | 18.0 |
| Soyabean lecithin | 3.6 |
| The benzoic acid salt of the tertiary-alkyl primary amine of Example 1 | 1.2 |
| Zinc di-isooctyl phosphorodithioate | 6.0 |
| SAE 5 mineral lubricating oil | 571.2 |
| Silicone anti-foam agent | 0.015 |
| Water | 400.0 |

Example 23 (emulsion)

| | Parts by weight |
|---|---|
| The polyisobutenyl succinic anhydride of Example A | 28 |
| Sodium hydroxide | 2 |
| SAE 5 mineral lubricating oil | 570 |
| Water | 400 |

Example 24 (emulsion)

| | Parts by weight |
|---|---|
| The polyisobutenyl succinic anhydride of Example A | 28 |
| Soyabean lecithin | 3.6 |
| Lauryl diethanolamine | 1.2 |
| Chlorinated eicosane wax (50% chlorine) | 1.2 |
| SAE 5 mineral lubricating oil | 565 |
| Sodium hydroxide | 2 |
| Silicone anti-foam agent | 0.015 |
| Water | 400 |

Example 25 (emulsion)

| | Parts by weight |
|---|---|
| The polyisobutenyl succinic anhydride of Example A | 28.5 |
| Lauryl diethanolamine | 1.2 |
| Chlorinated eicosane wax (50% chlorine) | 1.2 |
| SAE 5 mineral lubricating oil | 568 |
| Calcium hydroxide | 1.5 |
| Water | 400 |
| Silicone anti-foam agent | 0.015 |

Example 26 (emulsion)

| | Parts by weight |
|---|---|
| The polyisobutenyl succinic anhydride of Example A | 28 |
| N-tert-nonyl acrylamide | 3.6 |
| Lauryl diethanolamine | 1.2 |
| Chlorinated eicosane wax (50% chlorine) | 1.2 |
| SAE 5 mineral lubricating oil | 565 |
| Calcium hydroxide | 1.8 |
| Water | 400 |
| Silicone anti-foam agent | 0.015 |

Example 27 (emulsion)

| | |
|---|---|
| The product of Example C | 30 |
| SAE 20 mineral lubricating oil | 570 |
| Water | 400 |

Example 28 (concentrate)

| | |
|---|---|
| The product of Example E | 300 |
| SAE 20 mineral lubricating oil | 200 |

Example 29 (emulsion)

| | |
|---|---|
| The product of Example K | 49.5 |
| Zinc diisooctyl dithiophosphate | 5 |

Example 30 (emulsion)

| | |
|---|---|
| The product of Example L | 495 |
| Soyabean lecithin | 3 |
| The tertiary-alkyl primary amine of Example 1 | 2 |

Example 31 (emulsion)

| | |
|---|---|
| The product of Example M | 150 |
| SAE 20 mineral lubricating oil | 450 |
| Water | 400 |

As indicated previously the emulsions of this invention are useful as lubricants as well as hydraulic fluids, especially fire-resistant hydraulic fluids for use in mining, die-casting and injection molding, welding equipment, etc. A specific illustration of such utility is as follows: an emulsion prepared from a mixture consisting of 95 parts (by weight) of an SAE 20 mineral lubricating oil, 2 parts of the polyisobutene-substituted succinimide of Example E, and 5 parts of water is useful as a power-transmitting fluid in a hydraulic pump.

Other advantages of the emulsions of this invention include, for example, thermal stability, wear-reducing properties, fire-resistance, rust-inhibiting properties, and anti-bacterial properties. Thus, for instance, the emulsion of Example 22 is found to pass the Heat Stability Test, in which a 50-cc. sample of the emulsion in a container is immersed in boiling water. (The emulsion is said to pass the test if no appreciable amount of water separates from the emulsion at the end of one hour of heating.)

The lubricating properties, especially the wear-reducing properties, of the emulsion of this invention are shown by the results of a proposed ASTM wear test. In the test, the emulsion is placed in a hydraulic pump (in this particular test, Vickers 104E Vane Pump) which is operated under the following conditions: motor speed, 1200 r.p.m.; approximate fluid flow rate, 2 gallons per minute; pressure, 1000 p.s.i.; and sump temperature, 150° F. The results of the test are shown in Table I. A commercial emulsion hydraulic fluid is also evaluated for the purpose of comparison.

The fire-resistance of the emulsions of this invention is shown by the fact that the emulsion prepared according to Example 22 is found to pass the fire-resistance test for hydraulic fluids as required by the Bureau of Mines of the U.S. Government (test procedure described in Federal Register, December 17, 1959, volume 24, number 245; title 30, part 35, and sections 35.1–35.23).

TABLE I

| Emulsion Hydraulic Fluid of Example No. | Test Duration (Hours) | Percent Wear | | | | |
|---|---|---|---|---|---|---|
| | | Vanes | Ring | Side Plate | Rotor | Total |
| 3 | 354 | 0.45 | 0.397 | 0.915 | | 0.183 |
| 4 | 300 | 0.32 | 0.26 | 0.13 | 0.048 | 0.14 |
| 21 | 300 | 0.11 | 0.127 | 0.082 | 0.015 | 0.067 |
| 22 | 300 | 0.108 | 0.487 | 0.024 | 0.037 | 0.129 |
| 22 | 300 | 0.049 | 0.028 | 0.049 | 0.015 | 0.032 |
| 22 | 1,000 | 0.79 | 0.84 | 0.090 | 0.039 | 0.276 |
| 22 | 1,000 | 0.436 | 0.76 | 0.188 | 0.041 | 0.281 |
| Commercial Fluid | 200 | 2.50 | 0.183 | 0.034 | 0.044 | 0.1645 |

The rust-inhibiting properties of the emulsions of this invention are shown by the results of a rust test in which one-half of a steel strip is immersed in a 50 cc. sample of the emulsion. At the end of five weeks, the strip is inspected for rust. The results are summarized in Table II.

TABLE II

| Emulsion Tested | Rust Result | |
|---|---|---|
| | Portion of Strip Immersed in Emulsion | Portion of Strip Exposed to Vapor of the Emulsion |
| Emulsion of Example 22 | Clean | Clean. |
| Commercial Emulsion Hydraulic Fluid (for purpose of comparison). | Clean | Heavy Rust. |

A portion of the unclaimed subject matter disclosed herein and relating to esters of the hydrocarbon-substituted succinic acids is disclosed and claimed in co-pending application Ser. No. 274,905 filed April 23, 1963. A portion of the unclaimed subject matter disclosed herein and relating to alkali and alkaline earth metal salts of the hydrocarbon-substituted succinic acids is disclosed and claimed in co-pending application Ser. No. 395,031 filed September 8, 1964.

What is claimed is:

1. A stable water-in-oil emulsion suitable for use as a lubricant and a hydraulic fluid comprising from about 1 to 80 parts of water, from about 20 to 99 parts of mineral oil, and from about 0.2 to 10 parts of a derivative of a hydrocarbon-substituted succinic acid having at least about 50 aliphatic carbon atoms in the substituent, said derivative is selected from the class consisting of (I) alkali metal salts, (II) alkaline earth metal salts, (III) esters of hydroxy-alkyl amines having less than about 6 carbon atoms in the alkyl radical and (IV) amides, imides, amidines, and salt of a nitrogen compound selected from the class consisting of ammonia, hydroxy-alkyl amines having less than about 6 carbon atoms in the alkyl radical, and alkylene polyamines having the structural formula

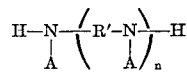

wherein $n$ is less than about 10, A is a hydrocarbon or hydrogen radical and R' is a lower alkylene radical having up to about 8 carbon atoms.

2. A stable water-in-mineral oil emulsion suitable for use as a lubricant and a hydraulic fluid comprising from about 20 to 50 parts of water, from about 50 to 80 parts of a mineral oil, and from about 1 to 5 parts of a substituted succinimide having the structural formula

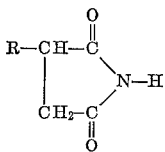

wherein R is a hydrocarbon radical derived from an olefin polymer having a molecular weight of at least about 700.

3. The emulsion of claim 1 characterized further in that it contains from 0.05 to 5 parts of a zinc phosphorodithioate.

4. The emulsion of claim 1 characterized further in that it contains from about 0.1 to 5 parts of a salt of benzoic acid with an aliphatic primary amine in which the aliphatic radical is a tertiary alkyl radical having from 8 to 18 carbon atoms.

5. The emulson of claim 1 characterized further in that it contains from about 0.01 to 5 parts of a phosphatide.

6. A stable water-in-oil emulsion suitable for use as a lubricant and a hydraulic fluid comprising from about 30 to about 60 parts of water, from 40 to about 70 parts of mineral oil, from about 0.5 to about 5 parts of a succinimide having the structural formula

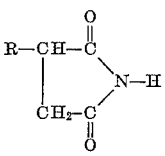

wherein R is a hydrocarbon radical derived from an olefin polymer having an average molecular weight from about 700 to about 5000, from about 0.05 to about 5 parts of a Group II metal dialkylphosphorodithioate, from about 0.1 to 5 parts of a salt of an aromatic carboxylic acid with an aliphatic amine having from about 8 to about 30 carbon atoms in the aliphatic radical, and from about 0.01 part to about 5 parts of a lecithin.

7. A stable, fire-resistant water-in-mineral oil emulsion suitable for use as a lubricant and a hydraulic fluid comprising from about 30 to about 60 parts of water, from about 40 to about 70 parts of a mineral oil, from about 1 to about 2 parts of a succinimide having a structural formula

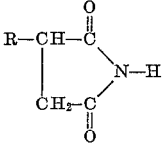

wherein R is a hydrocarbon radical derived from a polyisobutene having a molecular weight from about 700 to about 1000, from about 0.1 to about 2 parts of a zinc dioctyl phosphorodithioate, from about 0.1 to about 1 part of a salt of benzoic acid with a tertiary-alkyl primary amine having from about 11 to 14 carbon atoms in the tertiary-alkyl radical, and from about 0.1 to about 1 part of soya bean lecithin.

8. A stable water-in-mineral oil emulsion suitable for use as a lubricant and a hydraulic fluid comprising from about 20 to 50 parts of water, from about 50 to 80 parts of a mineral oil, and from about 1 to 5 parts of the product obtained by the reaction of a hydrocarbon-substituted succinic acid having at least about 50 aliphatic carbon atoms in the substituent with an alkylene polyamine having the structural formula

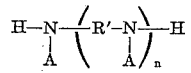

wherein $n$ is less than about 10, A is a hydrocarbon or hydrogen radical and R' is a lower alkylene radical having up to about 8 carbon atoms, said product being selected from the group consisting of amides, imides, amidines, salts and mixtures thereof.

9. A stable water-in-mineral oil emulsion suitable for use as a lubricant and a hydraulic fluid comprising from about 20 to 50 parts of water, from about 50 to 80 parts of a mineral oil, and from about 1 to 5 parts of the product obtained by the reaction of a hydrocarbon-substituted succinic acid having at least about 50 aliphatic carbon atoms in the substituent with a polyethylene polyamine having up to about 11 amino groups, said product being selected from the group consisting of amides, imides, amidines, salts and mixtures thereof.

10. A stable water-in-mineral oil emulsion suitable for ues as a lubricant and a hydraulic fluid comprising from about 20 to 50 parts of water, from about 50 to 80 parts of a mineral oil, and from about 1 to 5 parts of the ester obtained by the reaction of a hydrocarbon-substituted succinic acid having at least about 50 aliphatic carbon atoms in the substitutent with a hydroxy-alkyl amine having less than about 6 carbon atoms in the alkyl radical.

11. A stable water-in-mineral oil emulsion suitable for use as a lubricant and a hydraulic fluid comprising from about 20 to 50 parts of water, from about 50 to 80 parts of a mineral oil, and from about 1 to 5 parts of the ester obtained by the reaction of a hydrocarbon-substituted succinic acid having at least about 50 aliphatic carbon atoms in the substituent with at least about 1 mole of a tri(hydroxy-alkyl) amine having less than about 6 carbon atoms in each alkyl radical.

12. A stable water-in-mineral oil emulsion suitable for use as a lubricant and a hydraulic fluid comprising from about 20 to 50 parts of water, from about 50 to 80 parts of a mineral oil, and from about 1 to 5 parts of the ester obtained by the reaction of a hydrocarbon-substituted succinic acid having at least about 50 aliphatic carbon atoms in the substituent with about 2 moles of tri(hydroxy-ethyl)amine at 60°–200° C.

13. The emulsion of claim 12 characterized further in that it contains from 0.05 to 5 parts of a zinc phosphorodithioate.

14. The emulsion of claim 12 characterized further in that it contains from about 0.1 to 2 parts of a zinc dialkylphosphorodithioate and from about 0.1 to 1 part of tertiary-alkyl amine having from about 11 to 14 carbon atoms in the alkyl radical.

References Cited by the Examiner
UNITED STATES PATENTS

| | | | |
|---|---|---|---|
| 2,257,601 | 9/1941 | Hall et al. | 252—49.9 |
| 2,374,682 | 5/1945 | Julian et al. | 252—49.9 |
| 2,798,045 | 7/1957 | Buck et al. | 252—34 X |
| 2,932,614 | 4/1960 | Lynch et al. | 252—32.7 |
| 2,965,574 | 12/1960 | Tierney et al. | 252—49.5 X |
| 3,037,051 | 5/1962 | Stromberg. | |
| 3,131,150 | 4/1964 | Stuart et al. | 252—51.5 X |
| 3,172,892 | 3/1965 | LeSuer et al. | 252—51.5 |

FOREIGN PATENTS

| | | |
|---|---|---|
| 478,308 | 1/1938 | Great Britain. |

OTHER REFERENCES

"Tertiary-Alkyl Primary Amines," Special Products Bulletin No. SP33, (September 1954) Rohm & Haas Co., Washington Square, Philadelphia 5, Pa.

DANIEL E. WYMAN, *Primary Examiner.*

P. P. GARVIN, *Assistant Examiner.*